US012781095B2

(12) United States Patent
Louette

(10) Patent No.: US 12,781,095 B2
(45) Date of Patent: Nov. 3, 2026

(54) ADHESIVE TAPE HAVING AN ANTI-SLIP SURFACE WHICH DOES NOT ADHERE TO THE ADHESIVE SURFACE AND MANUFACTURING METHOD THEREOF

(71) Applicant: PACKINVEST, Cebazat (FR)

(72) Inventor: Jean-Marie Louette, Buxeuil (FR)

(73) Assignee: PACKINVEST, Cebazat (FR)

( * ) Notice: Subject to any disclaimer, the term of this patent is extended or adjusted under 35 U.S.C. 154(b) by 263 days.

(21) Appl. No.: 18/577,251

(22) PCT Filed: Jul. 7, 2022

(86) PCT No.: PCT/IB2022/056269
§ 371 (c)(1),
(2) Date: Jan. 6, 2024

(87) PCT Pub. No.: WO2023/281427
PCT Pub. Date: Jan. 12, 2023

(65) Prior Publication Data

US 2024/0352283 A1 Oct. 24, 2024

(30) Foreign Application Priority Data

Jul. 7, 2021 (FR) ....................................... 2107338

(51) Int. Cl.
*C09J 7/20* (2018.01)

(52) U.S. Cl.
CPC ........... *C09J 7/201* (2018.01); *C09J 2301/16* (2020.08); *C09J 2301/312* (2020.08); *C09J 2301/50* (2020.08)

(58) Field of Classification Search
CPC ........ C09J 7/201; C09J 7/203; C09J 2301/16; C09J 2301/312; C09J 2301/50;
(Continued)

(56) References Cited

U.S. PATENT DOCUMENTS 3,554,835 A * 1/1971 Morgan ..................... C09J 7/38 156/289
5,462,765 A 10/1995 Calhoun et al.
(Continued)

FOREIGN PATENT DOCUMENTS

EP 0511129 A1 10/1992
EP 2071001 A1 6/2009

OTHER PUBLICATIONS

International Search Report (with English translation) for PCT/IB2022/056269, mailed Oct. 26, 2022.

*Primary Examiner* — Scott R. Walshon
(74) *Attorney, Agent, or Firm* — Jordan IP Law, LLC; Todd A. Vaughn

(57) ABSTRACT

Adhesive tape that includes a support provided with a first or front face and a second or rear face, an adhesive layer that covers at least part of the rear face, a mixed layer that covers the front face. The mixed layer has two successive coatings that include an "anti-slip" coating and a "anti-adherent" coating, each of which can be carried out first or second, and which form an alternation of thin parts and thick parts. The coating carried out first covers a predetermined area of the surface of the front face, and the coating carried out secondly covers a predetermined area of the surface formed by the front face at least partially covered by the coating carried out first. The anti-slip coating covers an area comprised between 5 to 80% of the area of the front face with a first composition forming a layer having anti-slip properties, the layer having a minimum thickness of 4 μm. The anti-adherent coating covers an area of between 20 to 100% of the area of the front face with a second composition forming a layer with anti-adherent properties, the layer with anti-adherent properties having a maximum thickness of 3 μm.

16 Claims, 4 Drawing Sheets

(58) Field of Classification Search
CPC ........ C09J 2483/005; B32B 3/10; B32B 3/14; B32B 3/26; B32B 3/263; B32B 3/30
See application file for complete search history.

(56) References Cited

U.S. PATENT DOCUMENTS

| | | | | |
|---|---|---|---|---|
| 6,015,615 | A * | 1/2000 | Sanchez | B32B 7/12 428/447 |
| 2004/0224113 | A1* | 11/2004 | Haas | B32B 27/36 428/40.1 |
| 2012/0094051 | A1* | 4/2012 | Chang | B32B 3/30 156/289 |
| 2013/0236691 | A1* | 9/2013 | Calkins | C08J 9/103 428/220 |
| 2014/0079900 | A1* | 3/2014 | Ramirez | C09J 7/21 442/101 |
| 2020/0353714 | A1* | 11/2020 | Terada | B32B 7/12 |
| 2021/0246335 | A1* | 8/2021 | Panhans | C09J 7/403 |

* cited by examiner

ADHESIVE TAPE HAVING AN ANTI-SLIP SURFACE WHICH DOES NOT ADHERE TO THE ADHESIVE SURFACE AND MANUFACTURING METHOD THEREOF

CROSS-REFERENCE TO RELATED APPLICATIONS

The present application is a National Stage Application of PCT International Application No. PCT/IB2022/056269 (filed on Jul. 7, 2022), under 35 U.S.C. § 371, which claims priority to French Patent Application No. 2107338 (filed on Jul. 7, 2021), which are each hereby incorporated by reference in their complete respective entireties.

TECHNICAL FIELD OF THE INVENTION

The present invention relates to the field of adhesive tapes and more particularly relates to an adhesive tape comprising an adhesive face and another face provided with a mixed layer with anti-slip and anti-adhesive properties, so that the adhesive face does not stick to the mixed layer when the strip is rolled up on itself. The present invention also relates to a method of manufacturing such an adhesive tape.

STATE OF THE TECHNIQUE

In order to stabilize objects during their transport and particularly for the transport of cardboard boxes on pallets, it is known from prior art to use anti-slip sheets which have two anti-slip faces and which are intended to be inserted between two levels of stacked cardboard boxes and/or between the layer of cardboard at the base of the stack and the pallet. This solution has the disadvantage that the anti-slip sheets must be removed and then repositioned between each palletization and that the sheets usually cut to the dimensions of the pallet do not make it possible to stabilize non-standardized boxes, for example if the boxes are of variable height.

A solution known from the prior art consists of using a sheet provided with an anti-slip side and comprising an adhesive layer on its other side. The adhesive side can then be stuck to the ground or to the top of a cardboard box, thus leaving the anti-slip side exposed. For example, we can cite Stabupatch™ adhesive labels or Safetyon™ anti-slip tapes, or Tesa™ 4863 (registered trademarks). These products are supplied in the form of rolled adhesive tapes, convenient to handle; they include a protective support film, also called liner or backing, affixed on top of the adhesive layer. The backing is rolled up with the adhesive tape. Its function is to protect the adhesive when it is wound and thus prevent the adhesive side from sticking with the opposite non-slip side. With this solution, a user can quickly unroll a desired length of adhesive tape using the dispenser, remove the protective backing and then stick the cut length of tape to create an anti-slip surface. This solution has the disadvantage that the backing makes the roll formed by winding the adhesive tape thicker, that the user must remove the backing by specific handling, and that the backing constitutes waste which the user must subsequently dispose of.

A solution to overcome the protective backing described in European Patent Publication No. EP 0 511 129 B 1 consists of providing a rolled tape comprising an adhesive face and an anti-slip face obtained by coating with a composition consisting of a thermoplastic resin with the addition of hollow microspheres whose core contains a volatile fluid which expands when this composition is heated. The expanded microspheres create an inhomogeneous surface which has anti-slip properties. According to the authors of this patent, said inhomogeneous surface is not created by sticky bridges when brought into contact with the adhesive face, which allows it to be wound in the form of coils. However, it is known that microspheres adhere to known PSA adhesives. The anti-slip properties of this tape are therefore obtained at the expense of its anti-adherent properties.

OBJECTS OF THE INVENTION

The applicant has sought to develop a tape having a face with an improved anti-slip effect and anti-adhesion properties compatible with adhesives having a stronger adhesive power, while minimizing the use of material during the application of the corresponding coatings on the support tape.

The Applicant has found that certain resin coatings, and in particular certain silicone resins, combine high anti-slip properties with high anti-adhesion, allowing them to be wound into a coil. However, the high price of these resins makes these anti-slip products economically unviable.

Thus, the present invention aims to offer a commercially viable tape comprising an adhesive face and which has on its other face high anti-slip properties with high anti-adhesion.

After having tried in vain different types of anti-slip resins that were less expensive or that could be used in thinner layers, the applicant found a solution which is based on the same types of resin as those already used, but which applies them in a new way, such as to obtain a product with a novel structure.

To this end, according to a first object, the invention aims at an adhesive tape which comprises a support provided with a first face, called the "front face", and a second face, called the "rear face", and in which:

- an adhesive layer covers at least part of the rear face,
- the front face is covered with a so-called mixed layer resulting from two successively applied coatings including a so-called "anti-slip" coating and a so-called "anti-adherent" coating, each of which can be carried out first or second, and which form an alternation of thin parts and thick parts,
- the coating carried out first covers a predetermined area of the surface of the front face and the coating carried out second covers a predetermined area of the surface formed by the front face at least partially already covered by the coating carried out first,
- the anti-slip coating covers an area comprised between 5% and 80% of the area of the front face with a first composition forming a layer having anti-slip properties, said layer having a minimum thickness of 4 μm and
- the anti-adherent coating covers an area comprised between 20% and 100% of the area of the front face with a second composition forming a layer with anti-adherent properties, said layer having a maximum thickness of 3 μm.

Preferably, the anti-slip coating covers an area comprised between 10% and 60% of the area of the front face. Very preferably, this area is comprised between 20% and 50%.

In some embodiments, the anti-adherent coating covers an area comprised between 20% and 95% of the area of the front face.

The mixed layer of the adhesive tape of the invention combines anti-slip properties, making it possible, for example, to stabilize cartons during their palletization, with anti-adherent properties. These anti-adherent properties allow the adhesive layer to come into contact with the mixed layer and therefore the adhesive tape to be wound and unwound during use.

Thanks to the provisions of the invention, the economic and environmental costs associated with the production of the adhesive tape are reduced by reducing the quantity of composition forming a layer having anti-slip properties which is used. It is understood that reducing the amount of chemicals used for the coatings results in a reduction in the cost of the layer and a reduction in the amount of chemical released into waste, after use of the adhesive tape.

The invention accomplishes this objective while maintaining satisfactory anti-slip and anti-adherent properties. Indeed, the applicant discovered that a first anti-slip coating with a partial coverage rate was sufficient to offer satisfactory anti-slip properties, as long as this first coating has a minimum thickness.

The expression “coverage rate” designates the area of a coating with respect to the area of the front face. For example, a coverage rate of 100% represents a total flat area of a coating, with an area equal to the area of the front face. Note that the “coverage rate” described above can also be called inking rate.

In the same way, the coverage rate of the mixed layer by thick zones represents the ratio between the area covered by thick zones and the total area of the front face.

According to another point of view, the invention makes it possible, for the same quantity of anti-slip coating used, to improve the anti-slip properties of a surface, by producing a thicker layer of anti-slip coating on only part of the mixed layer.

Furthermore, the applicant has discovered that the combination of this first coating with a second anti-adherent coating makes it possible to obtain good anti-adherent properties for the mixed layer, provided that the surface covered by the second coating represents at least a minimum coverage rate.

The two coatings making up the mixed layer create an alternation of thick parts and thin parts.

According to the embodiments of the invention, said thin parts and thick parts can be formed by the superposition of two coatings, or be formed by one coating only.

We define by “anti-slip properties” the property of a surface to present a certain resistance to movement when positioned flat on any support and when it is subjected to movement on this support, it being understood that this resistance is not due to the effect of glue or any other adhesive system of this type. Anti-slip properties are evaluated by measuring the coefficient of friction.

The coefficient of friction is determined by the horizontal plane method for determining the static and kinetic coefficients of friction according to standard NF ISO 15359:1999.

This method, well known to those skilled in the art, consists of determining the static and kinetic coefficients of friction from the measurement of the forces necessary to initiate and maintain the movement of a sled in a horizontal axis.

“Anti-adherent properties” are defined as the property of a surface to have a low tack with a given adhesive, so that the surface having anti-adherent properties does not stick with said adhesive. Within the meaning of the invention, a material is sticky if it is necessary to apply a significant force to the hand to detach it or if it damages the surface to which it has adhered, for example by removing fragments from the surface to which it sticks.

The anti-adherent properties are evaluated by anti-adhesion measurement according to the FTM 3 method proposed by the European association of the self-adhesive label industry (FINAT). This method, known to those skilled in the art, consists of evaluating the force necessary to separate (delaminate) the silicone protector from the adhesive front, by separating, according to a standardized protocol, the components of a complex formed by an adherent tape on an adhesion surface, at a constant angle of 180° and at a speed of 300 mm/minute. The width of the tape is set at 25 millimeters.

The adhesive tape according to the invention is particularly advantageous because it makes it possible, by adjusting the coverage rates and/or the thicknesses of the first coating with anti-slip properties and of the second anti-adherent coating, to obtain a high coefficient of friction and low adhesion.

Thus, in some embodiments, the mixed layer is configured to have coefficients of friction greater than or equal to 0.5 and adhesion with the adhesive layer less than or equal to 250 gram-force per centimeter. In some embodiments, the coefficients of friction of the mixed layer are greater than or equal to 0.7, preferably greater than 0.8, or greater than 0.9 or greater than 1 or greater than 1.2.

“Coefficients of friction” refer to the static coefficient of friction and the kinetic coefficient of friction (also called “coefficient of dynamic friction”). Depending on the anti-slip material used in the mixed layer, these coefficients of friction may be similar or different from each other.

In some embodiments, the mixed layer is configured to exhibit adhesion with the adhesive layer of less than or equal to 200 gram-force per centimeter, preferably less than or equal to 150 gram-force per centimeter, very preferably less than or equal to 30 gram-force per centimeter.

Advantageously, the composition used during anti-slip coating comprises silicone.

Advantageously, the alternation of thick parts and thin parts on the front face forms repetitive patterns.

Thanks to these arrangements, the anti-slip and anti-adherent properties are substantially the same at different locations of the mixed layer.

In some embodiments, the product of the coverage rate of the first coating and the thickness expressed in μm of the first coating is comprised between 2 and 30. This product will also be called “P” in the context of this application. Preferably the product P is comprised between 2 and 20, very preferably it is comprised between 2 and 5.

These arrangements make it possible to optimize the results in terms of savings linked to the reduction in the quantity of material used for the first coating and the anti-slip performance of the mixed layer obtained.

In some embodiments, the thick parts are constituted by the layer deposited during one of the anti-adherent or anti-slip coatings and the thin parts are constituted by the layer deposited during the other coating. Preferably, the thick parts are constituted by the layer deposited during the anti-slip coating and the thin parts are constituted by the layer deposited during the anti-adherent coating.

In other words, according to these embodiments, the thick parts are only formed by the layer deposited during one of the coatings and the thin parts are formed only by the layer deposited during the other coating, unlike other embodiments in which the layers are superimposed.

These embodiments allow material savings.

In some embodiments, the alternation of thick parts and thin parts forms a pattern chosen from a pattern of strips parallel to each other, a chevron pattern, a pattern of wavy lines, a checkerboard pattern or an arrangement of blocks.

In other embodiments, the pattern is a logo, or any other pattern with a coverage rate of thick parts strictly less than 1.

Advantageously, the minimum dimension of the pattern is approximately 100 μm, compatible with current printing techniques.

In some embodiments, the layer formed during the anti-slip coating has a thickness comprised between 4 μm and 300 μm. Preferably the layer formed during the anti-slip coating has a thickness comprised between 30 μm and 100 μm. Preferably the layer formed during the anti-slip coating has a thickness comprised between 7 μm and 50 μm, very preferably this thickness is comprised between 7 μm and 25 μm.

In some embodiments, the layer formed during the anti-adherent coating has a thickness comprised between 0.1 μm and 10 μm. Preferably the layer formed during the anti-adherent coating has a thickness comprised between 0.5 μm and 5 μm. Very preferably this thickness is comprised between 1 μm and 3 μm.

In some embodiments, the exposed surfaces of the mixed layer are substantially planar.

Advantageously, the deposition of the anti-slip layer by printing methods such as screen printing, heliography, flexography, inkjet, fiberization, nozzle system or any other process allowing significant deposits, allows the obtaining of reliefs, formed of thick parts and thin parts, uniform and repetitive. These methods make it possible to obtain exposed surfaces of the mixed layer that are substantially flat.

In some embodiments, the anti-slip coating is carried out using a silicone-based composition which crosslinks under the effect of humidity or of a crosslinking agent and/or of a catalyst.

In some embodiments, the anti-slip coating is carried out using a silicone-based composition comprising expandable microspheres. Preferably, said composition is chosen so as to be able to crosslink under exposure to ultraviolet radiation.

In some embodiments, the anti-slip coating is carried out using a polyurethane-based composition.

In some embodiments, the anti-slip coating is carried out using a composition comprising an aqueous anionic dispersion of polyurethane. Preferably, said composition is chosen so as to be able to crosslink by a thermal drying method.

In some embodiments, the anti-adherent coating is made with a silicone-based composition in an aqueous emulsion which crosslinks under the effect of a crosslinking agent and/or of a catalyst.

In some embodiments, the anti-adherent coating is made with a solvent-free silicone composition which crosslinks under the effect of a crosslinking agent and/or of a catalyst and/or by exposure to ultraviolet radiation.

In some embodiments, the anti-adherent coating is made with a composition comprising an aqueous dispersion of a polyethylene wax modified with a polytetrafluoroethylene (PTFE).

Preferably, said composition crosslinks by drying or thermal heating.

According to the invention, the layer formed during the anti-slip coating covers an area comprised between 5% and 80% of the area of the front face and has a minimum thickness of 4 μm. Depending on the inking rate of the anti-slip layer and the thickness of the anti-slip layer, the mass of the anti-slip composition deposit per unit area of the front face, expressed in grams per square meter ($g/m^2$), varies. Advantageously, the mass of deposit of anti-slip composition per unit area is comprised between 5 $g/m^2$ and 30 $g/m^2$. Preferably, the mass of the anti-slip composition deposit per unit area of the front face is comprised between 10 $g/m^2$ and 25 $g/m^2$. Very preferably, the mass of the anti-slip composition deposit per unit area of the front face is comprised between 12 $g/m^2$ and 20 $g/m^2$.

According to a second aspect, the invention relates to a method of manufacturing an adhesive tape, provided with a support comprising a first face called "front face", and a second face called "rear face" covered at least partly with an adhesive layer, said method comprising:

- a first step of coating the front face with a first composition forming a layer having anti-slip properties with a minimum thickness of 4 μm on a surface comprised between 5% and 80% of the area of the front face, and
- a second step of coating the front face with a second resin composition forming a layer having anti-adherent properties with a maximum thickness of 3 μm on a surface comprised between 20% and 100% of the area of the front face, knowing that the order of said first and second coating steps can be reversed, the coating carried out first covering a predetermined area of the surface of the front face and the coating carried out second covering a predetermined area of the surface formed by the front face at least partially already covered by the coating carried out first.

In some embodiments, the steps of depositing a first coating and depositing a second coating are carried out using printing methods chosen from screen printing, heliography and flexography.

In some embodiments, the steps of depositing a first coating and depositing a second coating are carried out using other printing or coating methods known to those skilled in the art, for example by roller coating, by air blades, by dragging blade, or by nozzles.

In some embodiments, the step of depositing a first coating is carried out by screen printing and the step of depositing a second coating is carried out by heliography.

In some embodiments, the first coating step and the second coating step are carried out by means of two printing groups marked with each other so that a first printing group deposits a coating and a second printing group deposits the other coating only in the areas not covered by the first printing group.

In some embodiments, the method comprises a step of treating the layer formed by the coating carried out first chosen from a corona surface treatment, a plasma surface treatment, or electrowetting.

Thanks to these arrangements, the adhesion between a coating and the front face or between the first and second coating is increased, making it easier to deposit.

In some embodiments, the method comprises a step of crosslinking the layer having anti-slip properties or the layer having anti-adherent properties.

Certain aims, advantages and particular characteristics of the process for manufacturing an adhesive tape which is the subject of the present invention being similar to those of the adhesive tape which is the subject of the present invention, they are not recalled here.

BRIEF DESCRIPTION OF THE FIGURES

Other advantages, aims and particular characteristics of the invention will emerge from the following non-limiting description of at least one particular embodiment of the adhesive tape and of the method of manufacturing such a tape, objects of the present invention, with regard to the appended drawings, in which.

The following numerical references are used in the figures and in the description which follows: 12, 14 and 16, Adhesive tapes according to the invention; 105 Support; 106 Front side of 105; 107 Back side of 105; 110 Adhesive layer; 120 or 140 Layer resulting from anti-adherent coating; 130 Layer resulting from anti-slip coating; 131 Thick parts of the mixed layer; 132 Thin parts of the mixed layer; 30 Device for manufacturing an adhesive tape according to the invention; 305 Unwinder; 306 Support roller 105; 315 and 330 First and second printing group; 317, 332 and 341 Dryers; 320 and 335 Cross-linking devices; 325 Corona treatment unit; 340 Adhesive layer coating group; 345 Winder; 346 Roll of adhesive tape according to the invention.

Reference numbers with four digits designate process steps.

DETAILED DESCRIPTION OF THE INVENTION

The present description is given on a non-limiting basis, each characteristic of an embodiment being able to be combined with any other characteristic of any other embodiment in an advantageous manner.

Figure 1:
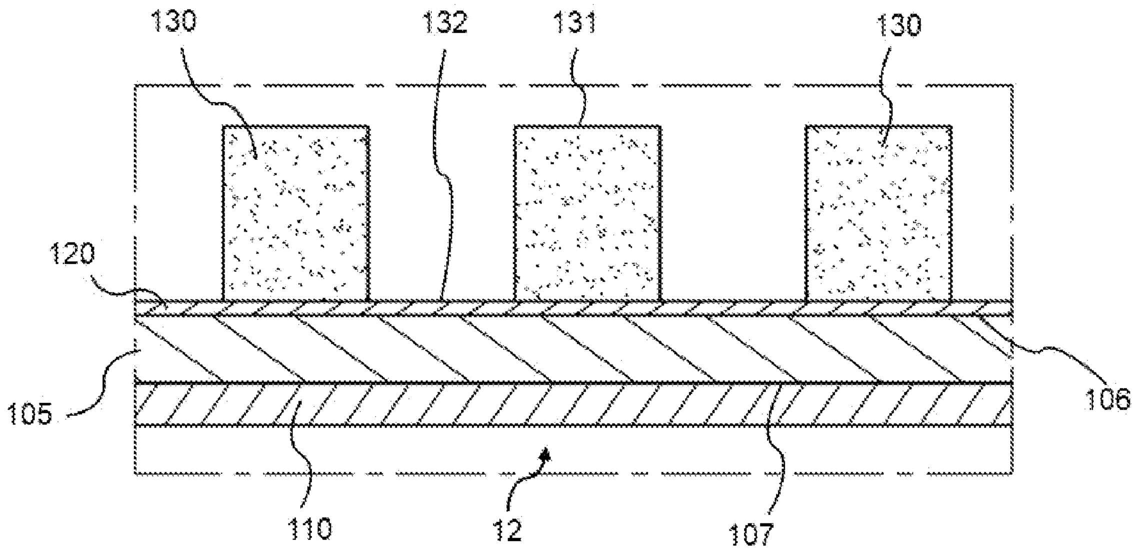
FIG. 1 represents, schematically and in longitudinal section view, a first particular embodiment of an adhesive tape which is the subject of the present invention.
Figure 2:
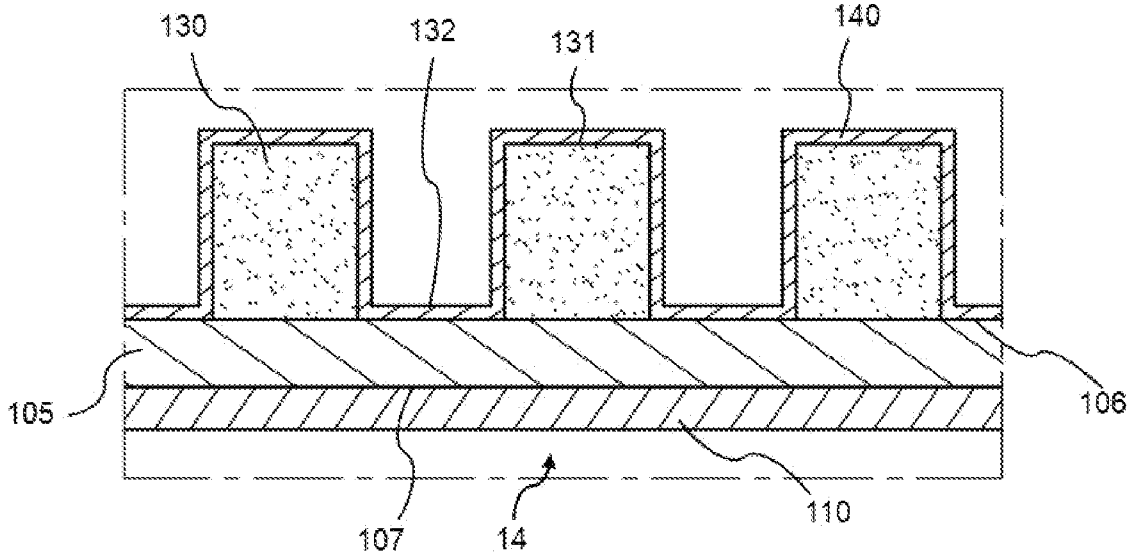
FIG. 2 represents, schematically and in longitudinal section view, a second particular embodiment of an adhesive tape which is the subject of the present invention.
Figure 3:
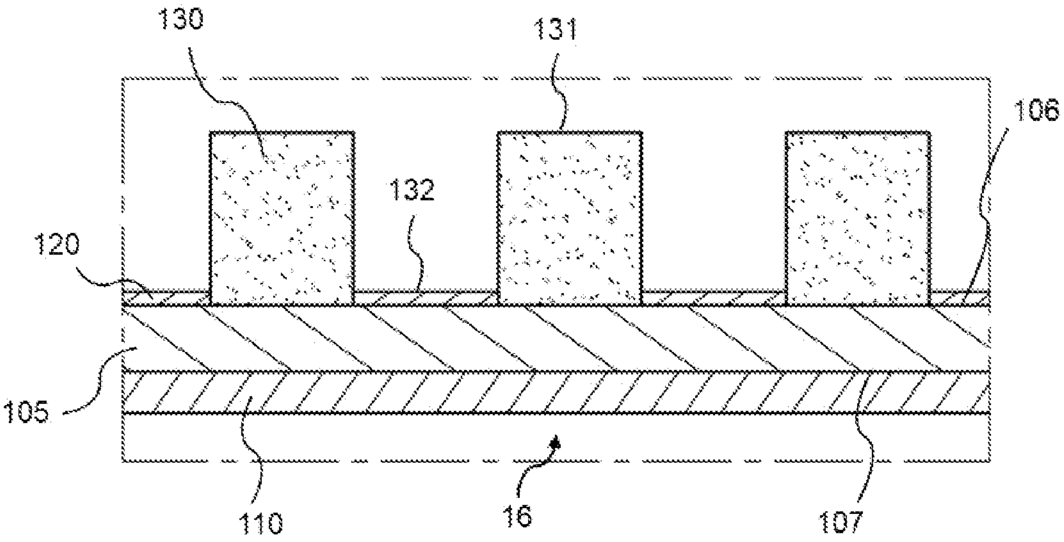
FIG. 3 represents, schematically and in longitudinal section view, a third particular embodiment of an adhesive tape which is the subject of the present invention.

It should be noted now that FIGS. 1 to 3 are not to scale and that FIGS. 6 to 9 are to scale but that the scales can vary between two figures.

We observe, in FIGS. 1, 2 and 3, a schematic view of different embodiments of an adhesive tape 12, 14 and 16 subjects of the present invention.

The adhesive tape 12, 14 or 16 includes a support 105 intended to receive coatings to make it a functional tape.

Choice of Support and Adhesive Layer

Any type of support well known in the field of adhesive tapes can be used. In particular, it is possible to choose as support 105 a thin paper with high tensile strength, which may be transparent or opaque. The support may in particular be chosen from the family of offsets, krafts, coated or uncoated, rubbed or unrubbed, recycled unglued, glued on one face or on both faces. The weight of the support will preferably be chosen between 25 $g/m^2$ and 220 $g/m^2$, preferably between 40 $g/m^2$ and 90 $g/m^2$, for example 60 $g/m^2$. The support may include a reinforcing grid made of cellulose fibers or textile fibers, for example cotton fibers.

The support can be chosen from reinforced papers.

The support 105 may also be a plastic film, such as for example a poly(ethylene) (abbreviated PE), a poly(propylene) (abbreviated PP), a polylactic acid (abbreviated PLA), a poly(vinyl chloride) (abbreviated PVC), a copolymer of PE and PP, a poly(terephthalate ethylene) (abbreviated PET), or even a biopolymer film. Such a support may, depending on the needs, be transparent or opaque, with a thickness comprised between 5 μm to 200 μm, preferably comprised between 10 μm to 80 μm, for example 30 μm.

The support 105 may also be chosen from non-wovens, textiles, cardboard, and any other flexible support well known to those skilled in the art.

The support 105 is a rollable tape, of very long length in relation to its width and of small thickness in relation to its width, so that the support 105 has two main faces of non-negligible areas. One face of the support is arbitrarily called the "front face" 106, the other face is called the "rear face" 107.

The rear face 107 of the support 105 is coated with an adhesive layer 110. The adhesive layer 110 may include any adhesive well known to those skilled in the art which is suitable for use on a support as described above. Preferably, the adhesive layer comprises a pressure-sensitive adhesive (abbreviated PSA) or a self-adhesive. Preferably, the adhesive is chosen to have an immediate tack and an adhesive power on paper and cardboard such that it causes the destruction of this paper or cardboard upon opening when it is torn from the surface of the paper or cardboard. Advantageously, a hot melt or aqueous adhesive, of the synthetic rubber or acrylic type, is used. As an example, the product Technomelt® PS 5020 N marketed by Henkel and the reference TLH 4280 E from Bostik may be used.

Properties of the Mixed Layer

The adhesive tapes 12, 14 and 16 according to the invention are remarkable in that the front face 106 of the support 105 comprises a mixed layer with anti-slip and anti-adherent properties, hereinafter called "mixed layer."

The mixed layer of adhesive tapes 12, 14 and 16 has the particularity of having thick parts 131 and thin parts 132 relative to a cutting plane perpendicular to the plane formed by the front face 106, illustrated in FIGS. 1, 2, and 3. In other words, the thickness of the mixed layer varies between a low thickness and a high thickness, these thicknesses being preferably substantially uniform over the entire layer of the first coating 130.

The thin parts 132 are of smaller thickness than the thick parts 131. For example, the thin parts 132 have a thickness comprised between 1 and 10 μm and the thick parts 131 have a thickness greater than 10 μm, preferably greater than 20 μm, very preferably greater than 25 μm.

The mixed layer includes a first coating 130 with anti-slip properties forming the thick parts.

The mixed layer also includes a second coating, 120 or 140, forming the thin parts positioned between two successive thick parts.

The first coating 130, called anti-slip coating, is advantageously a coating comprising a silicone composition.

These may be single-component or multi-component compositions, preferably solvent-free.

Single-component compositions may consist of a silicone which crosslinks under the influence of humidity, preferably at room temperature. Such products are commercially available, for example the product sold under the trade name ELASTOSIL™ 50 by the company Wacker. The multi-component compositions may, for example, comprise a base silicone polymer (typically a polydimethylsiloxane with functional and auxiliary groups), a crosslinking agent (which may be a polydimethylsiloxane with hydrogenated groups) and a catalyst, which may be a compound of platinum dissolved in a polydimethylsiloxane.

In some embodiments, the anti-slip coating is produced with a silicone-based composition comprising expandable microspheres. For example, the composition includes the product SilForce™ SM3300 by the company Momentive and also includes non-expanded microspheres in aqueous dispersion, for example the product Expancel™ 820 SLU 40 marketed by the company Akzo Nobel.

In some embodiments, the anti-slip coating 130 is produced with a polyurethane-based composition, for example the product sold under the name ESACOTE SW3™ by the company Lamberti.

The second coating, 120 or 140, has anti-adherent properties. Preferably, the adhesion force of the second coating, 120 or 140, with the adhesive layer 110 is less than the adhesion force between the adhesive layer 110 and the first coating 130.

The second coating, 120 or 140, called anti-adherent, is advantageously a coating comprising a silicone composition; it may be a multi-component composition based on an aqueous emulsion of a polydimethylsiloxane carrying vinyl groups. This composition may also include a catalyst (for example an aqueous emulsion of a platinum compound dissolved in a polydimethylsiloxane bearing vinyl groups) and a crosslinking agent (for example an aqueous emulsion of a methylhydrogen poly-siloxane).

In some embodiments, the anti-adherent coating, 120 or 140, is produced with a composition comprising the product sold under the name DEHESIVE™ EM 490, by the company Wacker.

In some embodiments, the anti-adherent coating, 120 or 140, is produced with a composition comprising the product TEGOR RC 1403, from the company EVONIK GMBH.

In some embodiments, the anti-adherent coating, 120 or 140, is produced with a composition comprising an aqueous dispersion of a polyethylene wax modified with a polytetrafluoroethylene, for example the product sold under the name DEUTERON OG 330™ by the company DEUTERON GMBH.

The mixed layer is preferably configured to have a static coefficient of friction greater than or equal to 0.5, preferably greater than or equal to 1.

Evaluation of Anti-Adherent Properties

Tests were carried out by the applicant to compare the delamination force of some commercially available adhesive tape rolls and compare it to the delamination force between the mixed layer according to the invention and a standard PSA adhesive which corresponds to the test 3, below. Tests 1 and 2 are commercially available tape delamination tests performed for comparison.

The anti-adherent properties are evaluated according to the FTM 3 method proposed by the European Association of the Self-Adhesive Label Industry (FINAT), already presented above.

The width of the tapes used as a sample during these tests is set at 25 millimeters.

The resistance values (to delamination) measured during these tests, that is to say the adhesion values, are gathered in Table 1, below.

TABLE 1

| | Resistance [gf/cm] |
|---|---|
| Test 1 | 192 |
| Test 2 | 241 |
| Test 3 | 10 |

Test 1 is a delamination test of a PP acrylic 25 pm H.T. AC 518N adhesive tape, supplied by Ocopa Emballages®. This tape has a BOPP (abbreviated from "Biaxally Oriented PolyPropylene") backing coated with an acrylic adhesive. In other words, the measured resistance corresponds to the delamination resistance between the BOPP backing and an acrylic adhesive coated on a BOPP backing.

Test 2 is a delamination test of a Tesa® 4313 PVO adhesive tape. This adhesive tape has a paper backing and a solvent-free adhesive. The measured resistance therefore corresponds to the resistance to delamination between paper and a solvent-free adhesive coated on a paper support.

The delamination forces measured during Tests 1 and 2 allow satisfactory unwinding of the adhesive tapes, without excessive resistance.

Test 3 is a delamination test of an adhesive tape according to the invention. The adhesive tape tested during Test 3 includes a kraft backing whose rear face is coated with a TLH 4280 E adhesive marketed by Bostik. TLH 4280 E adhesive is a Pressure Sensitive hot melt Adhesive (PSA). The front face of said support is coated with a mixed layer according to the invention.

Test 3, which aims to simulate unwinding of an adhesive tape according to the invention, measures the resistance to delamination between the TLH 4280 adhesive coated on the kraft support and a mixed layer according to the invention coated on a kraft support.

It is noted that the mixed layer tested has low adhesion with the adhesive layer, measured at 10 gf/cm of separation resistance, allowing easy unwinding of the adhesive tape according to the invention. Preferably, the separation resistance is less than or equal to 250 gram-force per centimeter (gf/cm). These adhesion values are sufficiently low to allow the adhesive layer to come into contact with the mixed layer and therefore the adhesive tape to be wound and unwound during use.

Organization of Layers According to Embodiments of the Adhesive Tape

According to a particular embodiment illustrated in FIG. 1, we observe that a total flat of anti-adherent coating 120 has been applied to the front face 106 of the support 105. By total flat we mean the deposition of a coating layer of constant thickness, deposited over the entire surface of the front face 106.

On top of the flat of the anti-adherent coating 120, an anti-slip coating 130 was deposited discontinuously. Mounds of anti-slip coating 130 of constant thickness were deposited at regular intervals on the exposed surface of the flat of the anti-adherent coating 120. Printing methods such as screen printing, heliography and flexography make it possible to obtain a repeated pattern on the first coating layer 130 having thick parts regularly spaced between them.

Figure 4:
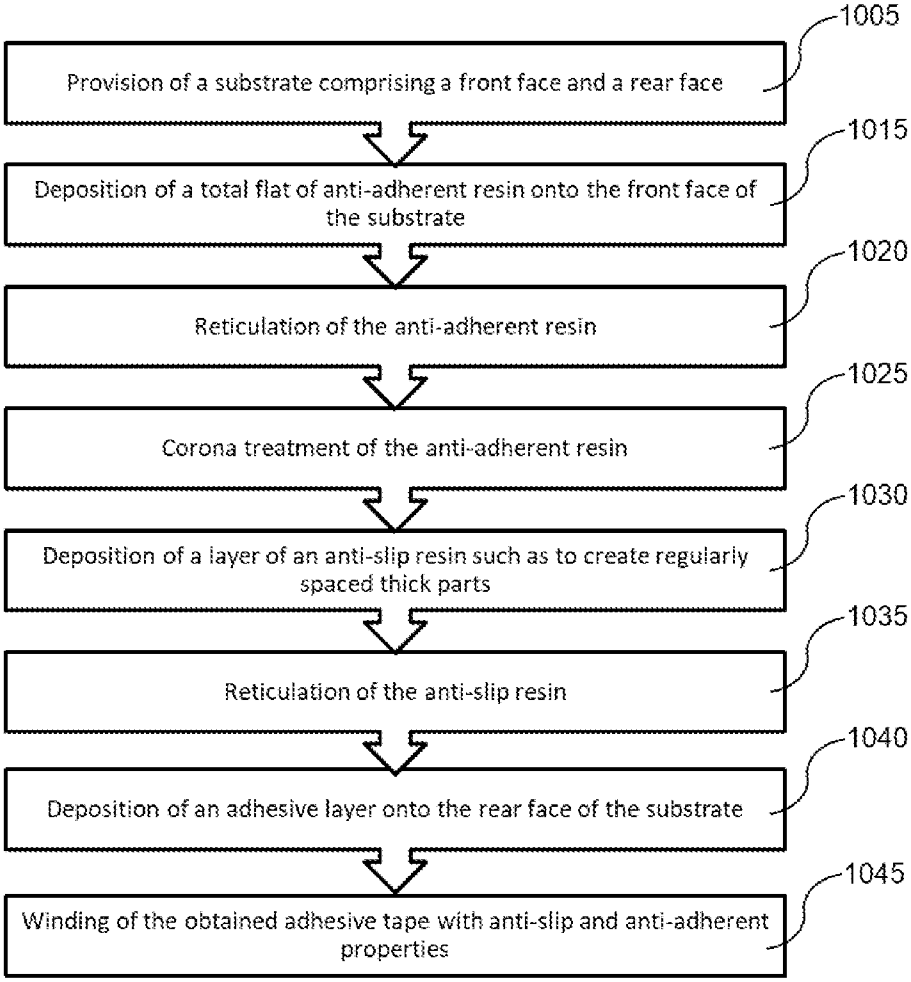
FIG. 4 represents, schematically and in the form of a flowchart, a particular succession of steps in the process of manufacturing an adhesive tape which is the subject of the present invention.

A particular manufacturing process making it possible to obtain an adhesive tape illustrated in FIG. 1 is illustrated in FIG. 4 and detailed below.

In particular embodiments, the first coating 130 and the second coating 120 are one and the same composition which have both anti-slip and anti-adherent properties.

Thus the thick parts of the mixed layer of the adhesive tape illustrated in FIG. 1 are formed of a thin layer of second coating 120 topped with a thick deposit of coating 130 while the thin parts are formed of a thin layer of the second coating 120.

According to a particular embodiment illustrated in FIG. 2, mounds of anti-slip coating 130 of constant thickness were deposited at regular intervals on the front face 106 of the support 105. After this first coating, a second deposit of anti-adherent coating 140 was made on top, depositing a thin layer of second coating 140 on the anti-slip coating 130 and on the still exposed parts of the face 106.

According to the particular embodiment illustrated in FIG. 2, the thick parts of the mixed layer are formed of a thin layer of second coating 140 overlying a thick deposit of coating 130, and the thin parts are formed of a thin layer of second coating 140.

According to a particular embodiment illustrated in FIG. 3, the deposition of anti-adherent coating 120 and the anti-slip coating 130 were carried out successively, so that areas of the front face 106 are covered by thick deposits of anti-slip coating 130 and the remaining areas are covered with a thin deposit of anti-adherent coating 120.

According to this particular embodiment, the steps of depositing anti-slip coating and anti-adherent coating are carried out by means of two printing groups identified between them so that a first printing group deposits a coating and a second printing group deposits the other coating only in the areas not covered by the first printing group.

According to the particular embodiment illustrated in FIG. 3, the thick parts of the mixed layer are formed of a thick coating deposit 130 in contact with the front face 106, and the thin parts of the mixed layer are formed of a thin second coating layer 140 in contact with the front face 106.

Pattern Formed by the Alternation of Thin Parts and Thick Parts

Whatever the embodiment, the alternation of thick parts and thin parts of the mixed layer preferably forms a pattern, that is to say a design formed by the alternation of thick parts and thin parts, repeated at regular intervals on the mixed layer. This pattern can be a geometric shape, for example strips parallel to each other, chevrons, wavy lines, or even a checkerboard.

Figure 6:
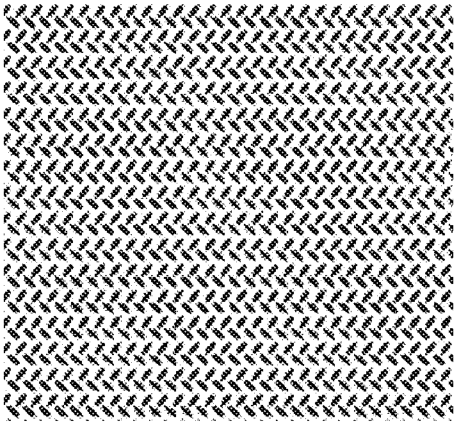
FIG. 6 represents, schematically, in top view a particular embodiment of the adhesive tape which is the subject of the invention, which has a first pattern formed by the alternation of thick zones and thin zones.
Figure 7:
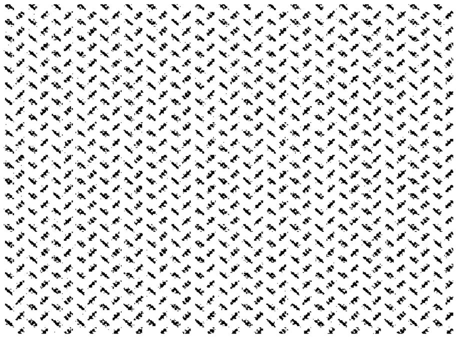
FIG. 7 represents, schematically, in top view a particular embodiment of the adhesive tape which is the subject of the invention, which has a second pattern formed by the alternation of thick zones and thin zones.

This pattern can also represent a logo or form letters or a sentence. For example, the pattern is chosen from those illustrated in FIGS. 6, 7, 8, and 9, in which the thick parts are shown in black color and the thin parts are shown in white color. It is noted that the patterns illustrated in FIGS. 6 and 7 are of the same type but the scale of the geometric shape forming the pattern is reduced on the pattern illustrated in FIG. 7, so that the coverage rate is lower.

Evaluation of Anti-Slip Properties Depending on the Pattern

The applicant has carried out tests to evaluate the anti-slip properties of a tape comprising a paper support covered with a coating with anti-slip properties made with a silicone-based composition which crosslinks under the effect of a catalyst.

The results of these tests are summarized in Table 2 below. The coefficient of friction is determined by the horizontal plane method for determining the static and kinetic coefficients of friction according to standard NF ISO 15359:1999, already described above. The thickness of the anti-slip layer is expressed in μm and the coverage rate (also called inking rate) of the paper support by the anti-slip coating is expressed as a percentage.

TABLE 2

| Pattern | Coverage rate [%] | Thickness [μm] | Coefficient of cinetic friction | P |
|---|---|---|---|---|
| Total flat | 100 | 10.1 | 0.6 | 10.1 |
| Chevron 16 | 16 | 9.8 | 0.6 | 1.57 |
| Chevron 16 | 16 | 13.2 | 0.9 | 2.11 |
| Chevron 30 | 30 | 14.2 | 1.1 | 4.26 |
| Checkerboard | 50 | 13 | 0.8 | 6.5 |

Figure 8:
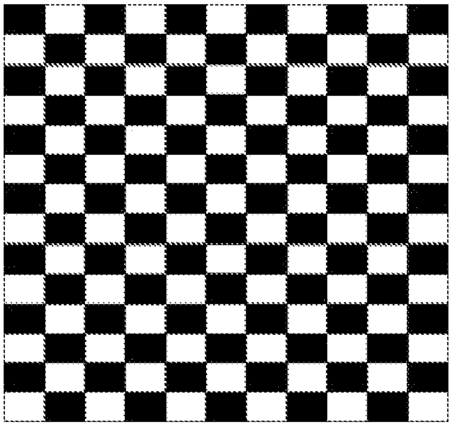
FIG. 8 represents, schematically, in top view a particular embodiment of the adhesive tape which is the subject of the invention, which has a third pattern formed by the alternation of thick zones and thin zones
Figure 9:
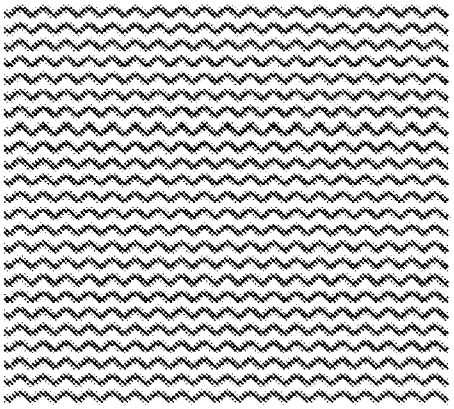
FIG. 9 represents, schematically, in top view a particular embodiment of the adhesive tape which is the subject of the invention, which has a fourth pattern formed by the alternation of thick zones and thin zones.

It is noted that the checkerboard pattern is illustrated in FIG. 8, that the chevron pattern 16 is illustrated in FIG. 7 and that the chevron pattern 32 is illustrated in FIG. 6.

It can be seen that equivalent anti-slip performances, that is to say substantially identical kinetic coefficients of friction, are obtained for a total flat area (coverage rate of 100%) and for a chevron pattern 16 (coverage rate of 16%), with a thickness of approximately 10 μm, respectively equal to 10.1 μm and 9.8 μm.

A thicker anti-slip layer makes it possible to obtain a greater kinetic coefficient of friction, as illustrated by the tests carried out with the chevron 16 patterns of 9.8 μm and 13.2 μm thickness which have a coefficient of friction of 0.6 and 0.9, respectively.

The 30 chevron pattern, with a greater coverage rate and a greater layer thickness, further increases the kinetic coefficient of friction.

Advantageously, the P value obtained by multiplying the coverage rate by the thickness (expressed in μm) is comprised between 2 and 30. More preferably it is comprised between 2 and 20, very preferably between 2 and 5.

Evaluation of Anti-Slip Properties Depending on the Mass of the Anti-Slip Composition Deposit Per Unit Area Depending on the inking rate of the anti-slip layer and the thickness of the anti-slip layer, the mass of the anti-slip composition deposit per unit surface area of the front face (expressed in grams per square meter) varies.

The anti-slip properties as a function of the mass of deposit of anti-slip composition were evaluated on various samples, by determining the static and kinetic coefficients of friction.

The coefficient of friction is determined by the horizontal plane method for the determination of the static and kinetic coefficients of friction according to standard NF ISO 15359:1999, already described above.

The applicant has determined that a mass deposit of anti-slip composition comprised between 5 $g/m^2$ and 30 $g/m^2$ offers good anti-slip performance while allowing a saving in the quantity of composition used during the anti-slip coating.

During tests carried out by anti-slip coating according to the invention, the values of static and kinetic coefficients of friction measured on the samples obtained are of the order of 0.8 or less for deposits of anti-slip composition with a mass less than 5 $g/m^2$. In order to obtain optimal static and kinetic coefficients of friction, greater than 0.85, it has therefore been determined that a deposit of anti-slip composition with a mass greater than 5 $g/m^2$ is preferable.

During tests carried out by anti-slip coating according to the invention, the values of static and kinetic coefficients of friction measured on the samples obtained are of the order of 1.2 or greater for deposits of anti-slip composition with an approximate mass of 25 $g/m^2$. It can be seen that by increasing the mass of the anti-slip composition deposit beyond 25 $g/m^2$, the gains in terms of increasing the values of static and kinetic coefficients of friction are minimal. In order to save on the quantity of composition used during anti-slip coating, it has therefore been determined that a deposit of anti-slip composition with a mass of less than 30 $g/m^2$ is preferable.

During additional tests, it was determined that a deposit mass of anti-slip composition comprised between 10 $g/m^2$ and 25 $g/m^2$ or even comprised between 12 $g/m^2$ and 20 $g/m^2$ is even more advantageous because such a deposit makes it possible to obtain static and kinetic coefficients between 1 and 1.2 while saving on the quantity of composition used during the anti-slip coating.

Method and Device for Manufacturing an Adhesive Tape

It can be seen in FIG. 4 a succession of particular stages of the process of manufacturing an adhesive tape which is the subject of the present invention. This process makes it possible in particular to produce an adhesive tape 12, 14 or 16 as described previously with reference to FIGS. 1 to 3. The adhesive tape comprises a support provided with a face called the "front face" and a face called the "rear face".

Figure 5:
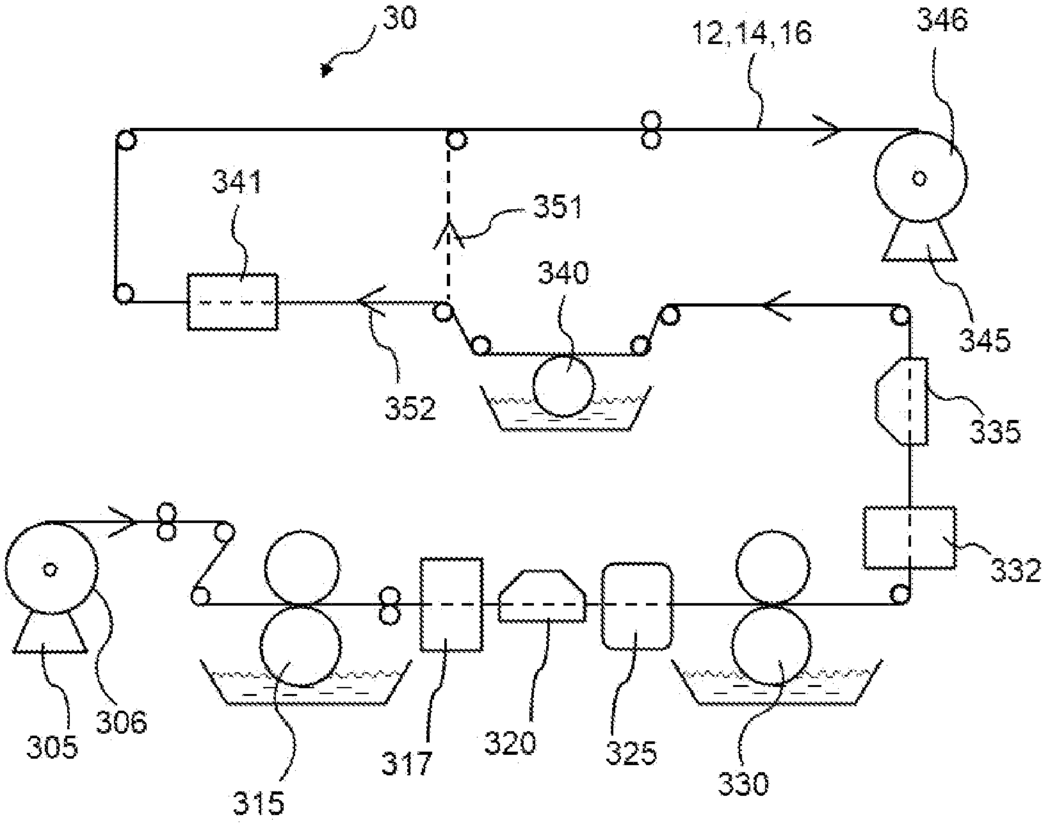
FIG. 5 represents, schematically, a device for manufacturing an adhesive tape which is the subject of the present invention.

It can be seen in FIG. 5 a device 30 allowing the manufacture of an adhesive tape by the process described in FIG. 4.

The main purpose of said method and of the device 30 is to cover at least partly the front face of an adhesive tape 12, 14 or 16 with a mixed layer with anti-slip and anti-adherent properties.

The process uses a first so-called anti-slip coating and a second so-called anti-adherent coating. These coatings already described above are not described again here.

The method includes a step 1005 of providing a support, of the type of support 105, described previously. The support 105 is typically supplied in the form of a roll 306 unrolled by an unwinder 305, under low mechanical tension, for its coating during the different stages of the process.

During a deposition step 1015 the anti-adherent coating is deposited in the form of a total flat on the front face of the support. Preferably, this step 1015 is carried out by a first printing group 315 configured to implement a screen printing, heliography or flexography method. Preferably this step is carried out using a heliographic method.

According to the heliographic method, the pattern to be printed is engraved on a cylinder.

During printing, the ink is deposited in the cells of the engraved cylinder, then the support to be printed is pressed between the engraved cylinder and a printing cylinder.

In Other Embodiments, this Step 1015 is Carried Out by an Inkjet Type Method, by Fiberization, by a Nozzle System or by any Other Process Allowing Significant Deposits.

In some embodiments, implemented when the anti-adherent coating is a crosslinkable coating, the method comprises a crosslinking step 1020. The crosslinking step 1020 is preferably carried out thermally, for example by hot air or by infrared radiation, in a crosslinking device 320. Depending on the nature of the coating, photochemical crosslinking by ultraviolet irradiation, or by any other crosslinking technique can be considered. Optionally, this step is preceded by a drying step using a dryer 317.

In some embodiments, the method comprises a step 1025 of corona surface treatment on the total flat of the anti-adherent coating surface deposited during the previous steps, with a view to facilitate the adhesion of the second coating with the first coating which will be deposited during the following step. The corona treatment step is carried out in a corona treatment unit 325 equipped with an electrode. This corona treatment is known as such to those skilled in the art and will not be explained here in greater detail. Any other surface treatment process having the effect of increasing the wettability of the surface, such as a plasma surface treatment or electrowetting, can also be used.

During a step 1030, the coating with anti-slip properties is deposited on the front face of the support so as to create thick parts of the mixed layer. This step is carried out by a second printing group 330. Preferably, these thick parts are regularly spaced. Preferably, the second printing group uses screen printing, heliography or flexography. Very preferably, the printing method used is a screen printing method.

According to the screen printing method, the pattern to be deposited, here formed of thick parts spaced apart from each other, is represented in negative on a finely perforated screen placed around a first cylinder. A mobile scraper spreads the coating on a sieve and forces it to pass through the perforations not blocked by the screen, to be deposited on the support.

Optionally, this step 1030 is followed by a second drying step through a dryer 332.

In some embodiments implemented when the anti-slip coating is a crosslinkable coating, the process comprises a crosslinking step 1035 similar to the crosslinking step 1020 already described above. This second crosslinking step is carried out in a second crosslinking device 335.

During a step 1040 a layer of adhesive is deposited on the rear face of the support according to in-line coating methods well known to those skilled in the art, which are not described in detail here. Said step 1040 is carried out by means of a coating group 340. Depending on the nature of the adhesive used, the adhesive tape may be circulated in a direction 352 leading to a circuit comprising a dryer 341 or circulated in a direction 351 leading directly to a winder 346, without prior drying.

At last, during a step 1045 the adhesive tape 12, 14 or 16 obtained by all of the previous steps is rolled up on itself. Incidentally, the method may include a step of cutting the roll 345 obtained into a plurality of rolls of smaller size which are more convenient to handle. This cutting can be done in a known manner during winding, by slitting to obtain several rolls of smaller width, and/or by cutting to obtain several shorter rolls.

Alternatively, the method may include, instead of step 1045, a format cutting step, that is to say cutting the adhesive tape into pieces of predetermined size.

It is of course understood that the steps described above for the process according to the invention can be carried out continuously on the same production line or discontinuously, by step or by group of steps, on separate production lines.

What is claimed is:

1. An adhesive tape, comprising:
 a support provided with a front face and a rear face;
 an adhesive layer that covers at least part of the rear face;
 a mixed layer that covers the front face, the mixed layer including successive coatings of an anti-slip coating and an "anti-adherent" coating which collectively form an alternation of thin mixed layer regions and thick mixed layer regions;
 wherein:

the successive coating conducted first covers a predetermined area of the surface of the front face, and the successive coating conducted second covers a predetermined area of the surface formed by the front face at least partially covered by the successive coating conducted first, the anti-slip coating covers an area between 5% to 80% of the area of the front face with a first composition forming a layer having anti-slip properties, the layer having a minimum thickness of 4 μm, the anti-adherent coating covers an area of between 20% to 100% of the area of the front face with a second composition forming a layer with anti-adherent properties, the layer with anti-adherent properties having a maximum thickness of 3 μm, the static coefficient of friction and/or the kinetic coefficient of friction of the mixed layer are respectively greater than or equal to 0.5, and the adhesion of the adhesive layer is less than or equal to 250 gram-force per centimeter.

2. The adhesive tape of claim 1, wherein a product between a coverage rate of the successive coating conducted first and the thickness expressed in μm of the successive coating conducted first is between 2 and 30.

3. The adhesive tape of claim 1, wherein the alternation of thick mixed layer regions and thin mixed layer regions forms a pattern chosen from a pattern of strips parallel to each other, a chevron pattern, a pattern of wavy lines, a pattern in checkerboard, or an arrangement of blocks.

4. The adhesive tape of claim 1, wherein the anti-slip coating has a thickness of between 7 μm and 25 μm.

5. The adhesive tape of claim 1, wherein exposed surfaces of the mixed layer are substantially planar.

6. The adhesive tape of claim 1, wherein the anti-adherent coating is produced using a composition chosen from:

a composition based on silicone in aqueous emulsion which crosslinks under an effect of a crosslinking agent and/or of a catalyst, and a solvent-free silicone-based composition which crosslinks under an effect of a crosslinking agent and/or of a catalyst.

7. The adhesive tape of claim 1, wherein the mass of deposit of anti-slip composition per unit surface of the front face is between 12 $g/m^2$ and 20 $g/m^2$.

8. A method of manufacturing an adhesive tape, the method comprising:

covering, at least in part, a front face and a rear face of a support with an adhesive layer;

forming an anti-slip coating via a silicone-based composition which crosslinks under an effect of humidity or of a crosslinking agent, and/or of a catalyst;

covering the front face with a mixed layer that includes successive coatings of the anti-slip coating and an anti-adherent coating which collectively form an alternation of thin mixed layer regions and thick mixed layer regions, wherein:

the successive coating conducted first covers a predetermined area of the surface of the front face, and the successive coating conducted second covers a predetermined area of the surface formed by the front face at least partially covered by the successive coating conducted first, the anti-slip coating covers an area between 5% to 80% of the area of the front face with a first composition forming a layer having anti-slip properties, the layer having a minimum thickness of 4 μm, the anti-adherent coating covers an area of between 20% to 100% of the area of the front face with a second composition forming a layer with anti-adherent properties, the layer with anti-adherent properties having a maximum thickness of 3 μm, the static coefficient of friction and/or the kinetic coefficient of friction of the mixed layer are respectively greater than or equal to 0.5, and the adhesion of the adhesive layer is less than or equal to 250 gram-force per centimeter.

9. The method of claim 8, wherein coating the front face with a first composition and coating the front face with a second resin composition are conducted via printing methods chosen from screen printing, heliography, and flexography.

10. The method of claim 8, wherein coating the front face with a first composition is conducted by screen printing and coating the front face with a second resin composition is conducted by heliography.

11. The method of claim 8, wherein coating the front face with a first composition and coating the front face with a second resin composition are conducted via two printing groups identified between them in order that a first printing group deposits a coating and a second printing group deposits the other coating only in areas not covered by the first printing group.

12. The method of claim 8, further comprising treating the layer formed by the coating conducted first using a treatment chosen from a corona surface treatment, a plasma surface treatment, or electrowetting.

13. The method of claim 8, further comprising crosslinking the layer having anti-slip properties.

14. The method of claim 8, further comprising crosslinking the layer having anti-adherent properties.

15. An adhesive tape, comprising:

a support provided with a front face and a rear face;

an adhesive layer that covers at least part of the rear face;

a mixed layer that covers the front face, the mixed layer including successive coatings of an anti-slip coating and an "anti-adherent" coating which collectively form an alternation of thin mixed layer regions and thick mixed layer regions;

wherein:

the successive coating conducted first covers a predetermined area of the surface of the front face, and the successive coating conducted second covers a predetermined area of the surface formed by the front face at least partially covered by the successive coating conducted first, the anti-slip coating covers an area between 5% to 80% of the area of the front face with a first composition forming a layer having anti-slip properties, the layer having a minimum thickness of 4 μm, the anti-adherent coating covers an area of between 20% to 100% of the area of the front face with a second composition forming a layer with anti-adherent properties, the layer with anti-adherent properties having a maximum thickness of 3 μm, and the anti-slip coating is formed via a silicone-based composition which crosslinks under an effect of humidity or a crosslinking agent, and/or a catalyst.

16. A method of manufacturing an adhesive tape, the method comprising:

covering, at least in part, a front face and a rear face of a support with an adhesive layer;

forming an anti-slip coating via a silicone-based composition which crosslinks under an effect of humidity or a crosslinking agent, and/or a catalyst;

covering the front face with a mixed layer that includes successive coatings of the anti-slip coating and an anti-adherent coating which collectively form an alternation of thin mixed layer regions and thick mixed layer regions, wherein:

the successive coating conducted second covers a predetermined area of the surface formed by the front face at least partially covered by the successive coating conducted first, the anti-slip coating covers an area between 5% to 80% of the area of the front face with a first composition forming a layer having anti-slip properties, the layer having a minimum thickness of 4 μm, the anti-adherent coating covers an area of between 20% to 100% of the area of the front face with a second composition forming a layer with anti-adherent properties, the layer with anti-adherent properties having a maximum thickness of 3 μm, and the anti-slip coating is formed via a silicone-based composition which crosslinks under an effect of humidity or a crosslinking agent, and/or a catalyst.

* * * * *